Oct. 10, 1939.   H. SCHLAGINTWEIT   2,175,448
ENGINE COOLING SYSTEM
Filed March 5, 1937   2 Sheets-Sheet 1
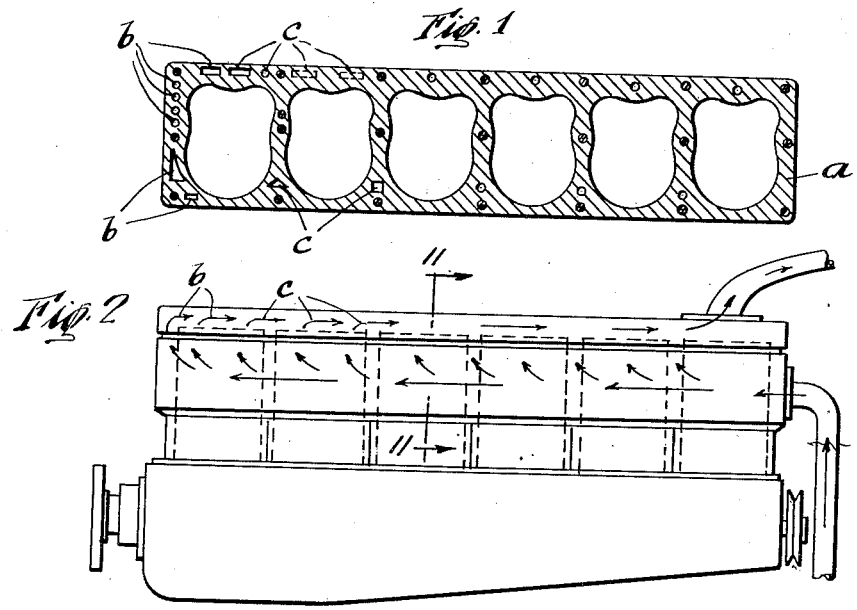
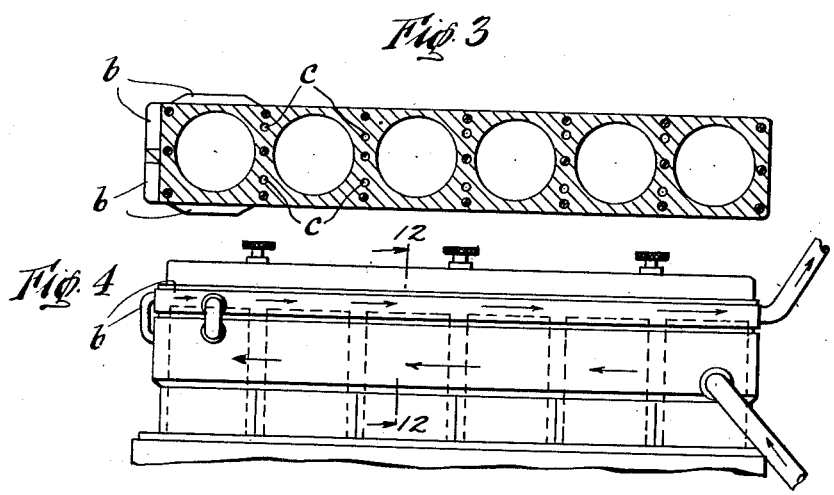
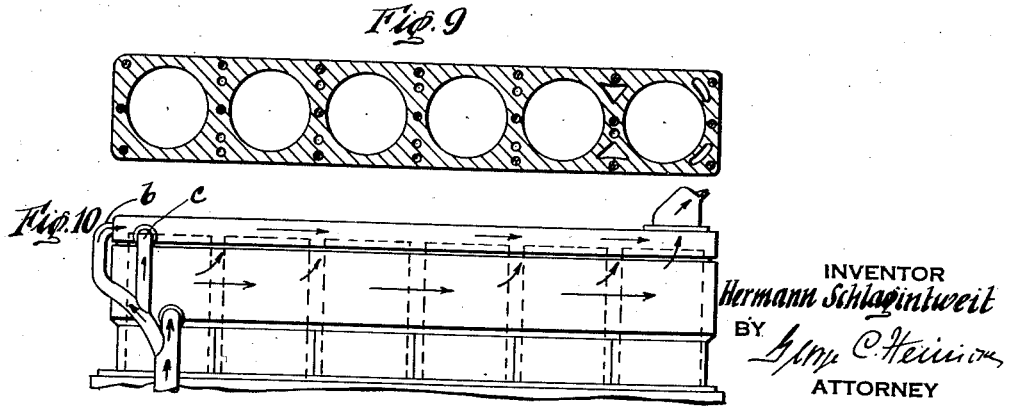
INVENTOR
Hermann Schlagintweit
BY
ATTORNEY Oct. 10, 1939.  H. SCHLAGINTWEIT  2,175,448
ENGINE COOLING SYSTEM
Filed March 5, 1937  2 Sheets-Sheet 2
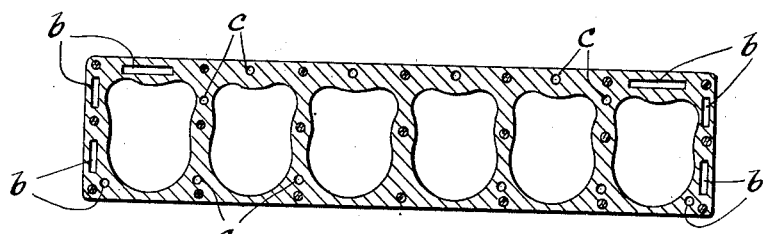
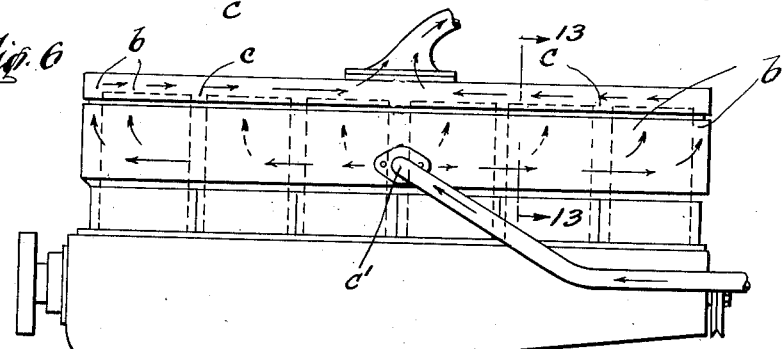
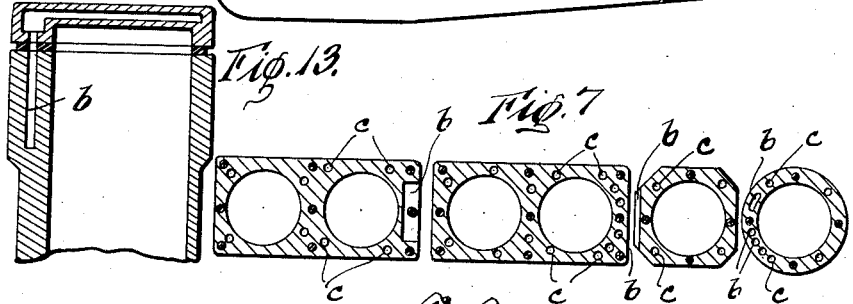
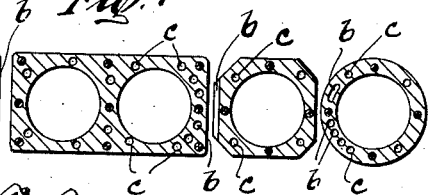
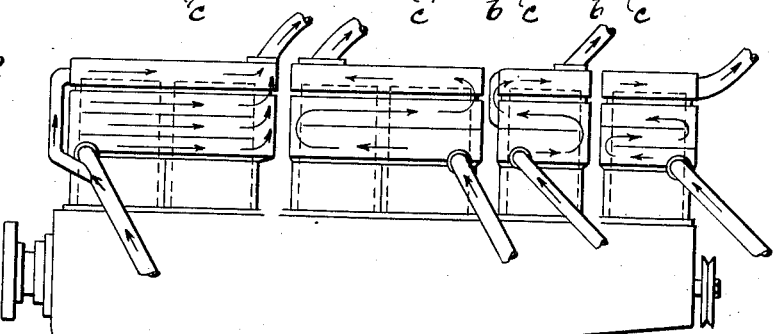
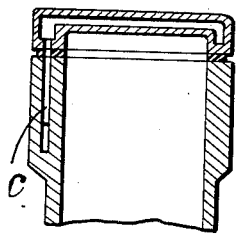
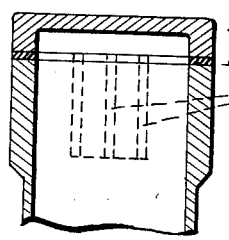
INVENTOR
*Hermann Schlagintweit*
BY
*George C. Heinicke*
ATTORNEY Patented Oct. 10, 1939

2,175,448

UNITED STATES PATENT OFFICE 2,175,448

ENGINE COOLING SYSTEM

Hermann Schlagintweit, West Orange, N. J.

Application March 5, 1937, Serial No. 129,127

1 Claim. (Cl. 123—173)

The present invention has for its object the provision of cooling systems for engines, particularly for internal combustion engines.

It is the main purpose of the invention to provide a cooling system warranting a cooling effect of the highest degree, even with the engine and the cooling medium or the means to be cooled working at their highest capacity.

This effect is principally produced with the aid of a novel application and embodiment of a system which per se is composed for its greater part of known elements. A few of these applications and embodiments are illustrated in the drawings as examples and in combination with the cylinder cooling systems of the best known types of internal combustion engines now in use.

These and other objects and advantages of the invention will become more fully known as the description thereof proceeds, and will then be specifically defined in the appended claim.

In the accompanying drawings forming a material part of this disclosure:

Fig. 1 is a top sectional plan view of a cylinder block and gasket, the cooling chambers of which are equipped with a cooling system constructed according to my invention.

Fig. 2 is a side elevation thereof.

Fig. 3 is a top sectional plan view of a cylinder block and gasket, the cooling chambers of which are equipped with a modified form of my cooling system.

Fig. 4 is a side elevation thereof.

Fig. 5 is a top sectional plan view of a cylinder block and gasket, the cooling chambers of which are equipped with another modified form of my novel cooling system.

Fig. 6 is a side elevation thereof.

Fig. 7 illustrates in top sectional plan views various forms of application of my cooling system to cooling chambers of cylinder blocks and gaskets divided by partitions in sub-divisions.

Fig. 8 is a side elevation thereof.

Fig. 9 is a top sectional plan view of a cylinder block and gasket, the cooling chambers of which are equipped with a further modified form of my cooling system.

Fig. 10 is a side elevation thereof.

Fig. 11 is a fragmentary vertical section on line 11—11 of Fig. 2.

Fig. 12 is a fragmentary vertical section on line 12—12 of Figure 4.

Fig. 13 is a fragmentary vertical section on line 13—13 of Fig. 6.

As illustrated in Figures 1 and 2, the wall of the cylinder block of an engine is designated $a$ and is provided with a plurality of conduits $b$ and $c$ of different or various cross-sections for the circulation of the cooling medium. $b$ and $c$ constitute thereby the point or points at which at least the main connection between the cooling chambers individually and by means of which at least the main portion of the respective current of the cooling medium is compelled first to pass always one of the cooling chambers to its entire extent, or at least nearly so before entering the next adjoining chamber. The arrows indicate the direction of flow of the cooling medium.

As illustrated in Figures 3 and 4 the system is modified by the arrangement of the conduits $b$ and $c$ in the mantles or jackets of the blocks to constitute the main connection between the cooling chambers, and also here the arrows indicate the direction of flow of the cooling medium.

In the modification of my invention illustrated in Figures 5 and 6, the passages $b$ and $c$ are of different cross-section areas causing a difference of flow in each passage to force the larger portion of the cooling medium to follow a circuitous path to the cylinder head at points remote from the inlet of the same in the cylinder head. Thus, the cooling medium on account of the variations in the cross-sectional areas will be compelled to circulate rapidly between inlet and outlet, and always present new quantities of the cooling medium to the parts to be cooled. This effect is still further increased by the division of the jacket by a partition wall directing the flow of the cooling medium in opposite directions; and $c'$ indicates the points of main connection between adjoining cooling chambers so that at least the main portion of the cooling medium for the respective chamber is compelled to enter through these conduits into the respective chamber. The individual cooling chambers may be divided into several compartments by means of suitable partitions, while the individual conduits may be partitioned into two conduits, so as to divide the cooling medium uniformly into branch currents and in order to force the cooling medium initially already into its direction of flow at its entrance into the respective chamber or compartment, necessary for a uniform union of the individual currents free of any back wash. Also here the arrows indicate the direction of flow of the cooling medium.

The form of my invention illustrated in Figures 7 and 8 shows the application of the cooling system to cylinder block cooling chambers and individual cylinder cooling chambers which are subdivided. By means of the conduits $b$ and $c$ formed by pipes or other suitable elements within the jacket or jackets themselves or within partition walls of the subdivided chambers, the cooling medium at or after its entrance into the respective chambers of the cylinder block is divided into branch currents in such manner as to make the cooling chamber of the cylinder head and its cooling medium therein independent of the current of the cooling medium passing through the cylinder cooling chamber and compelling the branch current of the cooling medium entered into the cylinder head cooling chamber to flow through the same in its entirety or nearly so, before it can leave said chamber. The arrows indicate the direction of flow of the cooling medium.

The further applications and modifications of my system are the same as illustrated in the forms of my invention illustrated in Figures 1 to 6.

In the modification of my invention illustrated in Figures 9 and 10, and here b and c indicate near the discharge opening the points through which at least the main portion of the cooling medium is discharged after the passage through the cylinder cooling chamber in order to pass to the discharge manifold or into the cooling chamber of the cylinder head for discharge from the cooling chamber of the cylinder block. The arrows indicate also here the direction of flow of the cooling medium.

It will be clear that naturally the direction of flow of the cooling medium in all embodiments of my invention can be reversed so as to flow in a direction opposite to that mentioned above.

It will also be clear that the above described embodiments and modifications of my invention can also be employed with the respective cooling chambers and the main cooling chamber of cylinder blocks or rows of cylinders which are either parallel or arranged in V-shape. Furthermore, one of the cooling chambers or the respective main cooling chamber may be divided into individual chambers in the direction of their longitudinal axis. The median partition in the conduit or conduits can also be arranged to pass entirely through the system as the drawings naturally illustrate only some of the constructions as examples of the cooling system for engines. It will also be clear that also the entrance and discharge openings for the cooling medium may be formed to suit and also the shape of the main cooling chamber.

In operation and practical use of my invention my system produces the following important advantages:

With the most simple and cheapest connection of the cooling chambers the system produces a most uniform and most powerful flow of the cooling medium through either the entire or nearly entire extension of the respective chambers by at least the main portion of the entering cooling medium. Thereby producing at all times the greatest possible withdrawal of heat by the cooling medium so that the greatest possible amount of heat is carried away by the cooling medium and from the same. My system produces furthermore a uniform flow of the cooling medium and avoids the formation of so-called heat collecting sacs within the cooling chambers, and thus avoiding overheating of the engines and of the means to be cooled and of the cooling medium itself which is very strongly observed and present with the known cooling devices and systems.

My system furthermore is the best guaranty for a long life and highest capacity of the engine.

It furthermore avoids all engine defects at present caused by superheating which are by no means slight.

My invention ensures the greatest safety of operation, keeps the engines at all times in good condition and prolongs their usefulness and life to the highest possible degree, and consequently lowers the cost of operation appreciably. It keeps the consistency of the lubricating oil in best condition and reduces the consumption thereof appreciably and in this manner also lowers the operation cost.

My system diminishes the danger of conflagrations of fire with internal combustion engines using a light inflammable medium for their operation, by the very high and effective operation of the cooling medium and the potent re-cooling of the exhaust gases.

My system furthermore, enables a considerable reduction in the quantity or volume of the liquid cooling medium used, and thereby allows a reduction in the size of the re-cooling device with engines cooled by a liquid cooling medium, thus again reducing the cost of manufacture by means of savings in material and labor.

Moreover, my novel cooling system allows the reduction in size of the blower arrangement or similar organs with air-cooled engines and thereby reduces the cost of manufacture of the same and thus increases the profit and utility.

My invention also allows an inexpensive mounting of the system and building of the same into used engines. It can be used with nearly all engines now being built and has numerous other advantages.

It will be understood that I have described and shown the preferred forms of my invention as examples of the many possible ways to practically construct the same, and that I may make such changes in the general arrangement of the system and in the construction of the minor details thereof as come within the scope of the appended claim without departure from the spirit of the invention and the principles involved.

It will also be understood that in case washers or gaskets are used within the system, the same must also be provided with the conduits, particularly in cases where these gaskets are provided with special supports or the like.

Having thus described my invention, what I claim as new, and desire to secure by Letters Patent is:

In a cooling system for an internal combustion engine, a cylinder block, a cooling jacket, a pipe conduit for feeding the cooling medium to the cooling jacket of the cylinder block, a partition wall in said jacket to direct the flow of the cooling medium in opposite directions, a discharge channel for the cooling medium divided by said partition, and oppositely disposed to said pipe conduit, and conduits in the cylinder head in communication with said jacket to direct the flow of the cooling medium in opposite directions towards said discharge channel at both sides of its partition.

HERMANN SCHLAGINTWEIT.